Patented Sept. 12, 1950

2,521,813

UNITED STATES PATENT OFFICE 2,521,813

SULFHYDRYL DERIVATIVES OF CHLORO-METHYL DIHYDROSAFROL

Herman Wachs, Brooklyn, N. Y., assignor to U. S. Industrial Chemicals, Inc., New York, N. Y., a corporation of Delaware No Drawing. Application April 27, 1949, Serial No. 90,043. In Brazil March 26, 1947

5 Claims. (Cl. 260—302)

This invention relates to new products which are useful insecticides and synergists for pyrethrins.

The products of the invention are prepared from chloromethyl dihydrosafrol and the sodium salts of various sulfhydryl compounds (namely, alkyl mercaptans having from one to eight carbon atoms in the alkyl radical, thiophenol and thiocresols, benzyl mercaptan, thionaphthols, 2-mercaptobenzothiazole and 2-mercaptothiazoline-Δ-4,5) with a splitting off of sodium chloride.

Chloromethyl dihydrosafrol is a material having the formula

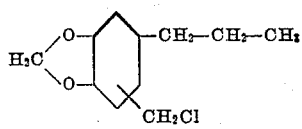

and may be prepared in accordance with the teachings of my copending application, Serial No. 658,872, filed April 1, 1946, now Patent 2,485,680, October 25, 1949, of which application the present application is a continuation-in-part.

Sulfhydryl compounds which may suitably be used in preparing the products of the present invention are methyl mercaptan, n-propyl mercaptan, i-propyl mercaptan, sec.-butyl mercaptan, i-amyl mercaptan, 2-ethylhexyl mercaptan, o-thiocresol, m-thiocresol, p-thiocresol, alpha-thionaphthol, etc.

The new products are suitably prepared by adding the sulfhydryl compound to absolute ethyl alcohol containing sodium ethoxide in amount equivalent to the sulfhydryl compound. Chloromethyl dihydrosafrol in amount equivalent to the sulfhydryl compound is then added to the mixture, and the mixture is thereafter refluxed. The product is recovered from the reaction mixture by conventional means, such as distillation or crystallization. For example, when methyl mercaptan is used, the preparation may be illustrated by the following equations:

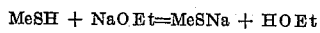

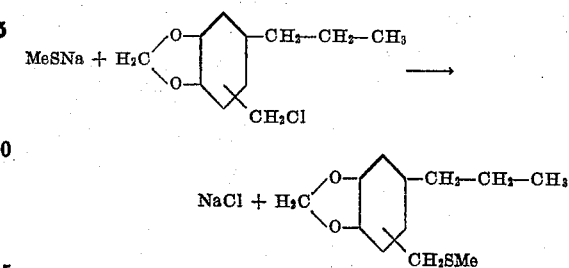

The following table contains data obtained in the Peet-Grady test on houseflies using various products falling within the scope of the present invention:

| Sulfhydryl Compound | Boiling range, °C., at mm. Hg. pressure | I 2% 10 minutes KD/OTI | II 2% Kill/OTI | III 1%+30 mg. 10 minutes KD/OTI | IV 1%+30 mg. Kill/OTI |
|---|---|---|---|---|---|
| Ethyl mercaptan | 115/1 | 0.32 | 0.53 | 0.88 | 0.85 |
| Thiophenol | 147-55/0.5 | 0.28 | 1.47 | 0.96 | 1.12 |
| Beta-thionaphthol | 182-212/0.5 | 0.06 | 1.47 | 0.95 | 1.06 |
| 2-Mercaptobenzothiazole | | 0.34 | 0.57 | 0.99 | 1.07 |
| 2-Mercaptothiazoline-Δ-4, 5 | | 0.14 | 0.96 | 0.95 | 1.21 |

In the preceding table, O. T. I. signifies the Official Test Insecticide, a solution of 100 mg. of pyrethrins in odorless kerosene.

The column headed I gives the ratio of the knockdown of a solution of 2% of the product in odorless kerosene at the end of 10 minutes to the knockdown of the O. T. I. at the end of 10 minutes.

The column headed II gives the ratio of the kill at the end of 24 hours of a 2% solution of the product in odorless kerosene to the kill of the O. T. I. at the end of 24 hours.

The column headed III gives the ratio of the knockdown at the end of 10 minutes of a solution of 1000 mg. of the product and 30 mg. of pyrethrins in 100 ml. of odorless kerosene to the knockdown of the O. T. I. at the end of 10 minutes.

The column headed IV gives the ratio of the kill at the end of 24 hours of a solution of 1000 mg. of the product and 30 mg. of pyrethrins in 100 ml. of odorless kerosene to the kill of the O. T. I. at the end of 24 hours.

The products of this invention may be employed alone or as synergists for pyrethrins in the conventional types of commercial insecticides. For example, they may be employed in solution in kerosene, as has been described, or they may be used as an active ingredient of insecticidal dusts. Thus, a suitable dust may be prepared by incorporating 2.5% of the product and 0.2% of pyrethrins into a carrier such as exhausted pyrethrum flowers, and thereafter diluting the carrier with three or four parts of talc.

I claim:

1. The compounds of the generic formula

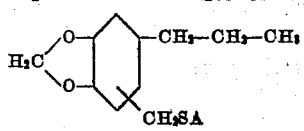

in which A is a radical selected from the group consisting of alkyl radicals having from one to eight carbon atoms, the phenyl radical, tolyl radicals, the benzyl radical, naphthyl radicals, the 2-benzothiazyl radical and the 2-thiazolinyl-Δ-4,5 radical.

2. The compounds of claim 1 in which A is an alkyl radical.

3. The compounds of claim 1 in which A is the ethyl radical.

4. The compounds of claim 1 in which A is the phenyl radical.

5. The compounds of claim 1 in which A is the beta-naphthyl radical.

HERMAN WACHS.

No references cited.